United States Patent

[11] 3,614,468

[72] Inventors Heinz-Wilhelm Ehlbeck
Schwaigern;
Reiner Engbert, Talheim, both of Germany

[21] Appl. No. 744,730
[22] Filed July 15, 1968
[45] Patented Oct. 19, 1971
[73] Assignee Telefunken Patentverwertungsgesellschaft m.b.H.
Ulm am Donau, Germany
[32] Priority July 20, 1967
[33] Germany
[31] P 15 37 455.7

[54] LOGIC CIRCUIT
9 Claims, 6 Drawing Figs.

[52] U.S. Cl. ........ 307/215, 307/216, 307/299, 307/318
[51] Int. Cl. ........ H03k 19/34
[50] Field of Search ........ 307/507, 203, 215, 216, 218, 299, 318

[56] References Cited

UNITED STATES PATENTS

| | | | |
|---|---|---|---|
| 2,850,647 | 9/1958 | Fleisher | 307/216 |
| 3,094,632 | 6/1963 | Wartella | 307/216 |
| 3,118,073 | 1/1964 | Walsh | 307/215 |
| 3,229,119 | 1/1966 | Bohn et al. | 307/299 |
| 3,281,607 | 10/1966 | Gariano | 307/215 |
| 3,283,170 | 11/1966 | Buie | 307/216 |
| 3,452,216 | 6/1969 | Hirsch | 307/215 |

*Primary Examiner*—Donald D. Forrer
*Assistant Examiner*—Harold A. Dixon
*Attorney*—Spencer and Kaye

ABSTRACT: A logic circuit having a transistor with several input electrodes for controlling the transistor and at least one output connected to the collector of the transistor. An electrode connected to the transistor serves as its emitter electrode when the logic circuit is operated as a NOR-gate. Further, means are connected to the emitter electrode to provide for selectively applying two different potentials thereto. When one of the potentials is applied to the emitter electrode the logic circuit operates as a NOR-gate, whereas when the other of the two potentials is applied to the emitter electrode, the logic circuit operates as a coincidence-gate.

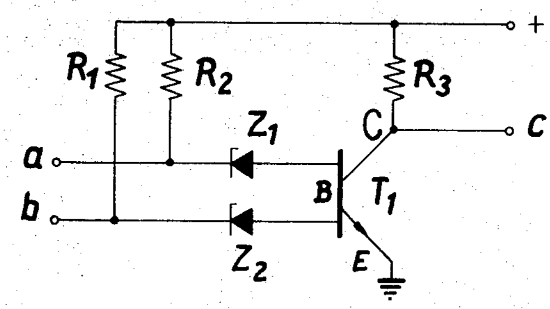
Prior Art
Fig. 1a
NOR-Function
| a | b | c |
|---|---|---|
| 0 | 0 | 1 |
| 1 | 0 | 0 |
| 0 | 1 | 0 |
| 1 | 1 | 0 |
Prior Art
Fig. 1b
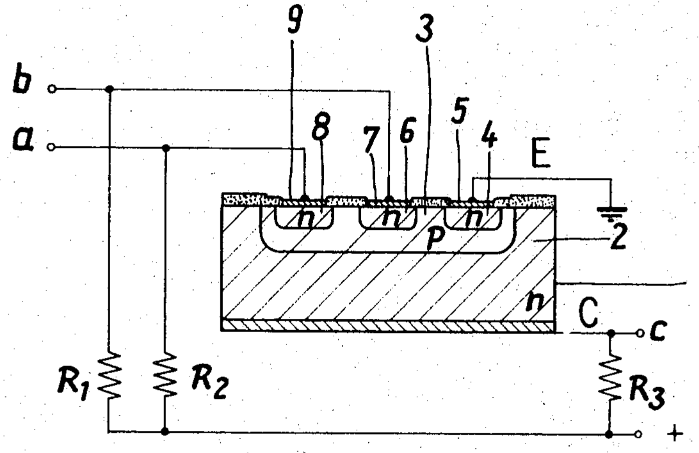
Fig. 1c
Inventor:
Heinz-Wilhelm Ehlbeck
Reiner Engbert
BY Spencer & Kaye
ATTORNEYS.

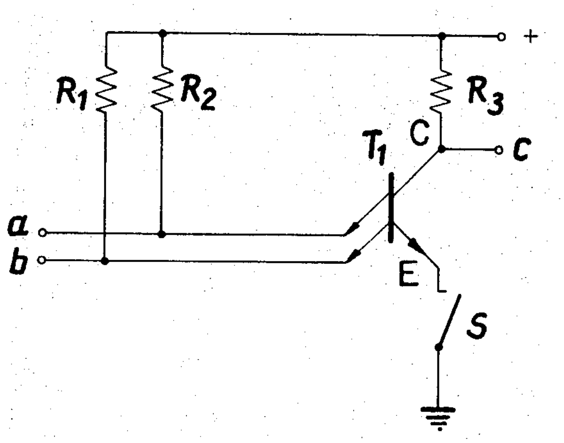
Fig. 2a
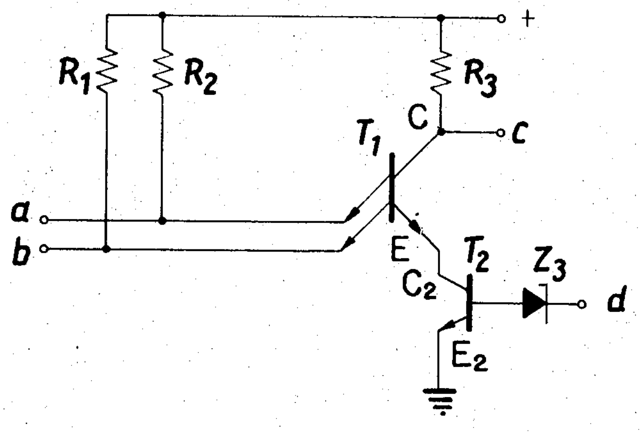
Fig. 2b
| | d | a | b | c |
|---|---|---|---|---|
| NOR-Function | 1 | 0 | 0 | 1 |
| | 1 | 1 | 0 | 0 |
| | 1 | 0 | 1 | 0 |
| | 1 | 1 | 1 | 0 |
| Coincidence Function | 0 | 0 | 0 | 1 |
| | 0 | 1 | 0 | 0 |
| | 0 | 0 | 1 | 0 |
| | 0 | 1 | 1 | 1 |
Fig. 2c
Inventor:
Heinz-Wilhelm Ehlbeck
Reiner Engbert
BY Spencer & Kaye ATTORNEYS.

LOGIC CIRCUIT

BACKGROUND OF THE INVENTION

The present invention relates to a logic circuit with a NOR-gate which performs the NOR-function and which includes a transistor having a plurality of input electrodes for its control and at least one output electrode connected to the collector of the transistor and an emitter electrode. The present invention contemplates providing means which can vary the potential of the emitter electrode in such a manner that the logic circuit carries out instead of a NOR-function for which it was originally designed, a coincidence-function.

The terms "NOR-function" or "NOR-gate", and "coincidence-function" or "coincidence-gate", as referred to above and throughout the entire specification and claims have the following meaning: a "NOR-gate" produces, at its output, a binary 1 only when binary 0 is applied to each of its inputs (see the table in FIG. 1*b*, referred to below, in which *a* and *b* are inputs and *c* is the output), while a "coincidence-gate" produces, at its output, a binary 1 only when the same binary signal (0 or 1) is applied to both of the inputs (see the three right-hand columns in the lower half of the table in FIG. 2*c*, referred to below, where *a* and *b* are inputs and *c* is the output).

SUMMARY OF THE INVENTION

It is, therefore, an object of the present invention to provide a simple, improved logic circuit which can perform a NOR-function or a coincidence-function, as desired.

In brief, the present invention relates to a logic circuit which includes means for switching such circuit, by a simple change in potential, from a NOR-gate to a coincidence gate. Such a logic circuit can, in particular, be easily realized when the NOR-gate is constructed in the form of a diode transistor logic circuit wherein Zener diodes are used as input diodes, arrangements of this type being conventionally known as DTLZ (Diode Transistor Logic Zener) elements. These Zener diodes are most easily obtained by constructing the transistor of the NOR-gate which is controlled by the potential at the input terminals of a semiconductor body provided with a collector zone, a base zone and a plurality of zones provided within the base zone which are of the same conductivity as the collector zone. Of such zones provided within the base zone, one zone is operated as the emitter electrode of the transistor, whereas the remaining zones, together with the base zone, act as Zener diodes and are used as input electrodes of the gate.

BRIEF DESCRIPTION OF THE DRAWINGS

FIG. 1*a* is a schematic view of a prior art NOR-gate logic circuit.

FIG. 1*b* is a truth table for the logic circuit of FIG. 1*a*.

FIG. 1*c* is a schematic illustration of the logic circuit of FIG. 1*a* which shows an enlarged cross section of a DTLZ element therein.

FIG. 2*a* is a schematic view of one form of the logic circuit according to the present invention.

FIG. 2*b* is a schematic view of another form of the logic circuit according to the present invention.

FIG. 2*c* is a truth table for the logic circuit of FIGS. 2*a* and 2*b*.

A conventional diode transistor logic circuit with Zener diodes which performs the NOR-function and which forms the basis of the present invention is shown in FIG. 1*a*. The NOR-gate shown in FIG. 1*a* consists of a transistor $T_1$ having a collector electrode C which is connected to the output terminal *c* and via a resistor $R_3$ to the positive pole of a DC voltage supply source. The transistor $T_1$ is, for example, a *npn* planar transistor. The emitter electrode E of the transistor $T_1$ is connected to ground potential, whereas each pole of the base electrode B is connected, via one Zener diode $Z_1$, and $Z_2$ each respectively, to the input terminals *a* and *b*, respectively. Each Zener diode is connected, via a resistor $R_1$ and $R_2$, respectively, to the positive pole of the DC voltage supply source. Thanks to the Zener diodes in the input paths of the gate, the gate is unlikely to respond to spurious voltage signals since the Zener voltage of the diodes is generally between 6 and 7 volts. The static resistance at the inputs *a* and *b* is thus more than 5 volts.

FIG. 1*b* shows a truth table of the gate illustrated in FIG. 1*a*. It can here be seen that, if a binary 1, in the form of a positive voltage pulse or in the form of a DC voltage which exceeds the Zener diode voltage, is applied to one of the two inputs *a* or *b*, the transistor $T_1$ becomes conductive and only a residual voltage is applied to the collector output C, which is equal to the binary 0. If, however, ground potential is applied to the input *a* as well as to input *b*, the transistor remains blocked or nonconductive and the positive potential of the voltage supply source is applied to the collector output. This means that a binary 1 is indicated at output *c* only when a binary 0 is present at both the inputs *a* and *b*.

FIG. 1*c* shows a DTLZ element constituting the realization of a circuit according to FIG. 1*a* wherein the transistor $T_1$ and the Zener diodes $Z_1$ and $Z_2$ are formed in a common semiconductor body 1. For this purpose, a *p*-conductive base zone 3 was diffused into an *n*-conductive semiconductor body 1. The remaining *n*-conductive portion of the semiconductor body 1 serves as the collector zone 2 of the transistor $T_1$. Three separated emitter zones 4, 6 and 8, which are also *n*-conductive, are diffused into the base zone 3. Zone 4 serves as the normal emitter zone for the transistor $T_1$ and the metal contact 5 of this zone is thus connected to ground potential. The two zones 6 and 8, together with the base zone 3 serve as the Zener diodes of the circuit. THe inputs *a* and *b* are connected, via the metal contacts 7 and 9 of the *n*-conductive zones 6 and 8, which act as Zener diodes, respectively, and via the barrier layers between themselves and the *p*-conductive zone 3, to the base of the transistor $T_1$. The PN-junctions of the above-mentioned zones all end on one surface side of the semiconductor body 1 and are covered with an insulating layer. THe metallic collector electrode C is connected to output *c*, and all inputs and outputs are connected, via resistors $R_1$, $R_2$, or $R_3$ to the voltage supply source.

FIG. 2*a* shows the circuit according to the present invention wherein a NOR-gate according to FIGS. 1*a* or 1*c*, respectively, can be switched, in a very simple manner, to be a coincidence-gate. As shown, it is necessary to provide an additional element, the switch S, in the circuit, according to FIG. 1*a*. With this switch S the electrode E, which acts as the emitter in the NOR-gate and is at ground potential can be disconnected from its connection to ground potential.

Once the emitter electrode E is disconnected from ground potential, and the inputs *a* and *b* are at ground potential i.e. a binary 0, no collector current can flow. The positive voltage of the voltage supply source, i.e. a binary 1, thus appears at output *c*. If a positive potential, i.e. a binary 1, is applied to both inputs *a* and *b*, no collector current will flow in this case either, since no current can flow off via the emitter electrode when it is cut off from ground potential. Thus, in this case, also a positive potential will appear at output *c*, i.e. a binary 1. If, however, the emitter electrode E is disconnected from ground potential and only one of the two inputs *a* or *b* is placed at ground potential, i.e. a binary 0, the corresponding input will simultaneously act as the emitter at ground potential of the transistor $T_1$. In this case, if there is a positive potential at the other input terminal, a collector-emitter current will flow through the grounded input. Thus, only the residual transistor voltage appears at output *c*, which corresponds to a binary 0.

Under circumstances, as described above, where either a binary 1 or a binary 0 is applied to both inputs *a* and *b* of the logic circuit resulting in a binary 1 at the output *c*, then a coincidence-function has been performed.

The negative of the coincidence-function leads to the anticoincidence-function which represents the summation portion of a half-adder. Thus far, it has been the practice in the art to carry out the anticoincidence-function by combining a plurality of AND- and NOR-gates or by combining a plurality of blocking gates. Thus, the logic circuit, according to the present invention, reduces the costs involved in providing a half-adder.

FIG. 2*b* shows another advantageous form of the switchable logic circuit according to the invention. According to this embodiment, instead of providing a switch S as in FIG. 2*a* a further transistor $T_2$ is provided in the circuit. The collector electrode $C_2$ of the transistor $T_2$ is here connected to the electrode E of the transistor $T_1$ which operates as the emitter in the NOR-gate, whereas the emitter electrode $E_2$ of transistor $T_2$ is grounded. The base zone of transistor $T_2$ is connected to a further input terminal *d* via a Zener diode $Z_3$. This Zener diode, which can, by the way, also be eliminated, is realized, as described in conjunction with FIG. 1*c*, by a second emitter zone applied within the base zone.

When the transistor $T_2$, for example, is also a NPN transistor, the circuit, according to FIG. 2*b*, acts as a NOR-gate upon a positive potential which exceeds the Zener potential being applied to input *d*, since then the transistor $T_2$ becomes conductive and the emitter electrode E of transistor $T_1$ is effectively connected to ground potential. If, instead, input *d* is grounded, transistor $T_2$ remains blocked or nonconductive so that no current will flow through the emitter electrode E of transistor $T_1$ either. The transistor $T_1$ is then cut off from ground potential. In this case, the circuit, according to FIG. 2*b*, operates as a coincidence-gate. Thus, control of the potential at input *d*, i.e. the application of a binary 0 or a binary 1, effects a changeover of the described logic linkage from a NOR-gate to a coincidence-gate or vice versa.

The truth tables for the two modes of operation of the described logic linkage are combined in FIG. 2*c*. The upper portion of the truth table applies to the NOR function of the logic circuit, which occurs when a positive potential exceeding the Zener potential is applied to input *d*, i.e. binary 1. The lower portion of the truth table represents the coincidence-function of the logic circuit which occurs when ground potential is applied to input *d*, i.e. binary 0.

The switchable gate logic circuit according to the present invention can, of course, also be constructed with PNP transistors instead of NPN transistors. The above-described NOR coincidence gate represents a significant improvement in the field of logic circuits, since it is now possible with such a dual-function gate circuit, to perform relatively complex algebraic operations, which heretofore required complex circuitry, with a relatively simple circuit having only a few individual gates of the above-described type.

It will be understood that the above description of the present invention is susceptible to various modifications, changes, and adaptations.

We claim:

1. In a diode-transistor logic NOR-gate including a single transistor, a plurality of logic signal input terminals coupled to the base of said transistor via similarly poled Zener diodes for controlling said base of said transistor, and at least one output terminal connected to the collector of said transistor; the improvement comprising:
   means connected to the emitter electrode of said transistor for selectively blocking the flow of current from said collector via said emitter electrode so that said logic circuit functions as a NOR-gate when said flow of current is not blocked and as a coincidence gate when said flow of current is blocked.

2. The circuit defined in claim 1 wherein said transistor has a plurality of emitter zones, one base zone and one collector zone, said emitter electrode being connected to one of said emitter zones and the remainder of said emitter zones being connected respectively to said signal input terminals to form said diodes with said base zone.

3. The circuit as defined in claim 1 wherein said transistor is connected in a grounded emitter configuration; and wherein said logic circuit includes a source of operating potential connected to said collector and to said plurality of input terminals via respective resistors.

4. The combination defined in claim 1 wherein binary 0 is represented by ground potential and binary 1 is represented by a positive potential.

5. The circuit defined in claim 1 wherein said means for selectively blocking the flow of current comprises a switch means for connecting said emitter electrode to ground when in a closed position and for disconnecting said emitter electrode when in an open position.

6. The combination defined in claim 5 wherein said switch means comprises a further transistor.

7. The combination defined in claim 6 wherein said further transistor has a collector-emitter path which is connected between said emitter electrode of said first-mentioned transistor and ground.

8. The combination defined in claim 7 wherein said further transistor has a control electrode, and means connected to said control electrode of said further transistor for rendering said collector emitter path of said further transistor conductive when said logic circuit is to function as a NOR-gate and for rendering said collector-emitter path of said further transistor nonconductive when said logic circuit is to function as a coincidence-gate.

9. The combination defined in claim 8 wherein said transistors are NPN transistors.